United States Patent
Smiecinski et al.

(10) Patent No.: US 9,637,585 B2
(45) Date of Patent: May 2, 2017

(54) VISCOELASTIC POLYURETHANE FOAM

(71) Applicant: BASF SE, Ludwigshafen (DE)

(72) Inventors: Theodore M. Smiecinski, Woodhaven, MI (US); Chad Alan Rogers, Dimondale, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/433,530

(22) PCT Filed: Oct. 8, 2013

(86) PCT No.: PCT/US2013/063846
§ 371 (c)(1),
(2) Date: Apr. 3, 2015

(87) PCT Pub. No.: WO2014/058857
PCT Pub. Date: Apr. 17, 2014

(65) Prior Publication Data
US 2015/0252140 A1  Sep. 10, 2015

Related U.S. Application Data

(60) Provisional application No. 61/712,031, filed on Oct. 10, 2012.

(51) Int. Cl.
| C08G 18/76 | (2006.01) |
| C08G 18/48 | (2006.01) |
| C08G 18/66 | (2006.01) |
| C08G 18/32 | (2006.01) |
| C08G 18/08 | (2006.01) |
| C08G 18/61 | (2006.01) |
| C08G 101/00 | (2006.01) |

(52) U.S. Cl.
CPC ......... *C08G 18/7621* (2013.01); *C08G 18/14* (2013.01); *C08G 18/3275* (2013.01); *C08G 18/4812* (2013.01); *C08G 18/4829* (2013.01); *C08G 18/4841* (2013.01); *C08G 18/4845* (2013.01); *C08G 18/61* (2013.01); *C08G 18/6688* (2013.01); *C08G 2101/0008* (2013.01); *C08G 2101/0058* (2013.01); *C08G 2101/0083* (2013.01)

(58) Field of Classification Search
CPC  C08G 18/7621; C08G 18/4829; C08G 18/61; C08G 18/14; C08G 18/4841; C08G 18/4812; C08G 18/3275; C08G 18/6688; C08G 18/4845; C08G 2101/0083; C08G 2101/0008; C08G 2101/0058
See application file for complete search history.

(56) References Cited

U.S. PATENT DOCUMENTS

| 3,655,588 A | 4/1972 | Mosso et al. |
| 4,632,943 A | 12/1986 | Nichols |
| 5,521,226 A * | 5/1996 | Bleys ................. C08G 18/4804 521/137 |
| 5,648,559 A | 7/1997 | Hager |
| 6,066,683 A * | 5/2000 | Beisner .............. C08G 18/4866 252/182.24 |
| 6,316,514 B1 * | 11/2001 | Falke ................. C08G 18/4804 252/182.27 |
| 6,653,363 B1 | 11/2003 | Tursi, Jr. et al. |
| 6,790,871 B1 | 9/2004 | Farkas et al. |
| 6,906,111 B2 | 6/2005 | Sawai |
| 7,208,531 B2 | 4/2007 | Neff et al. |
| 7,238,730 B2 | 7/2007 | Apichatachutapan et al. |
| 2003/0181538 A1 | 9/2003 | Martel et al. |
| 2004/0266900 A1 | 12/2004 | Neff et al. |
| 2005/0049324 A1 | 3/2005 | Hashimoto et al. |
| 2005/0131095 A1 * | 6/2005 | Yu ...................... C08G 18/4841 521/159 |
| 2012/0161353 A1 | 6/2012 | Hannig et al. |

FOREIGN PATENT DOCUMENTS

| EP | 0 934 962 B1 | 6/2002 |
| EP | 1 990 354 A1 | 11/2008 |
| WO | WO 01/07521 A1 | 2/2001 |
| WO | WO 2008/021034 A2 | 2/2008 |
| WO | WO 2008/063613 A1 | 5/2008 |

OTHER PUBLICATIONS

International Search Report for Application No. PCT/US2013/063846 dated Dec. 2, 2013, 3 pages.
Smiecinski, Theodore M. et al., "Visco-Elastic Polyurethane Foam: The Impact of Isocyanate Upon Foam Morphology", BASF Corp., Sep. 26, 2006, pp. 405-416.

* cited by examiner

*Primary Examiner* — John Cooney
(74) *Attorney, Agent, or Firm* — Howard & Howard Attorneys PLLC

(57) ABSTRACT

The subject disclosure provides a viscoelastic polyurethane foam and a method of forming the viscoelastic polyurethane foam. The viscoelastic polyurethane foam comprises the reaction product of a toluene diisocyanate and an isocyanate reactive component. The isocyanate reactive component comprises a first polyether triol, a second polyether triol, an amino alcohol chain extender, and a hydrolyzable polyether polydimethylsiloxane copolymer. The first polyether triol has a weight-average molecular weight of from 500 to 5,000 g/mol, at least 60 parts by weight ethyleneoxy units, based on the total weight of the first polyether triol, and at least 10% ethyleneoxy end caps. The second polyether triol, which is different from the first polyether triol, has a weight-average molecular weight of from 5,000 to 10,000 g/mol and at least 80% ethyleneoxy end caps.

15 Claims, No Drawings

VISCOELASTIC POLYURETHANE FOAM

RELATED APPLICATIONS

This application is the National Stage of International Patent Application No. PCT/US2013/063846, filed on Oct. 8, 2013, which claims priority to and all the advantages of U.S. Provisional Patent Application No. 61/712,031, filed on Oct. 10, 2012, the content of which is incorporated herein by reference.

FIELD OF THE DISCLOSURE

The subject disclosure relates to a viscoelastic polyurethane foam and a method of forming the viscoelastic polyurethane foam. The viscoelastic polyurethane foam exhibits excellent physical properties over a broad range of temperatures, especially at lower temperatures.

DESCRIPTION OF THE RELATED ART

Viscoelastic polyurethane foams are typically used in home and office furnishings. In home and office furnishings, viscoelastic polyurethane foams must exhibit suitable comfort and support properties over a fairly narrow temperature range. A considerable amount of research has also been focused on the development of viscoelastic polyurethane foams which are suitable for use in the transportation industries, e.g. for use in seating applications in various vehicles, such as automobiles, off-road vehicles, tractors, etc. In contrast to home and office applications, viscoelastic polyurethane foams in vehicles must exhibit suitable comfort and support properties over a fairly broad temperature range. More specifically, because viscoelastic polyurethane foams in vehicles are exposed to a wide range of temperatures and conditions these viscoelastic polyurethane foams must exhibit suitable comfort and support properties at these temperatures and conditions. For example, a seat comprising viscoelastic polyurethane foam in an automobile in Arizona may be exposed to temperatures exceeding 60° C. during the day and temperatures below freezing 0° C. during the night. As another example, a seat comprising viscoelastic polyurethane foam on an off road vehicle or a tractor could be used in desert regions, in arctic regions, or even a region with severe seasonal climate changes, i.e., a region having cold winters and hot summers, such as in the upper Midwest of the Unites States of America. As such, viscoelastic polyurethane foams used in vehicles must exhibit suitable comfort and support properties over a wide range of temperatures and conditions. Further, viscoelastic polyurethane foams used in vehicles must maintain their comfort and support properties for many years despite exposure to such extreme temperatures and conditions.

When the viscoelastic polyurethane foam is a seat cushion, body heat from the user warms a portion of the viscoelastic polyurethane foam, thus softening the viscoelastic polyurethane foam. The result is that the seat cushion molds to the shape of the body part in contact with the seat cushion, creating a more uniform pressure distribution, which increases comfort. In addition, the remainder of the viscoelastic polyurethane foam remains hard, providing support. Thus, temperature sensitivity increases the effective support factor of the viscoelastic polyurethane foam, allowing the construction of, for example, a seat without metal springs.

Viscoelastic polyurethane foams exhibit slow recovery, and thus high hysteresis, during a compression cycle and also typically have low ball rebound values. These physical properties may result from either low airflow, as the recovery is limited by the rate of air re-entering the viscoelastic polyurethane foam, or by other physical properties of the polyurethane foam. While most of the physical properties of viscoelastic polyurethane foams resemble those of conventional polyurethane foams, the resilience of viscoelastic polyurethane foams is much lower, generally less than about 15%. Polyurethane foams having these physical properties (viscoelastic properties) typically provide excellent comfort and support properties in various bedding and seating applications.

However, viscoelastic properties are usually temperature-sensitive, and are typically maximized when the polyurethane of the polyurethane foam undergoes a glass transition. By manipulating the structure and composition of a polyether soft segment phase so that the glass transition temperature of the polyurethane approximately coincides with a use temperature of the polyurethane foam, the viscoelastic properties of the polyurethane foam are maximized.

Viscoelastic polyurethane foams are typically formed with reactants, e.g. isocyanates and polyols, which react to form a polyurethane having a glass transition temperature at or around the use temperature to provide optimal viscoelastic properties at and around that temperature. Although the viscoelastic properties of the viscoelastic polyurethane foams are optimal at the glass transition temperature(s) of the polyurethane, the viscoelastic properties of these viscoelastic polyurethane foams are not typically optimized over a wide range of temperatures. As such, viscoelastic polyurethane foams do not typically exhibit sufficient comfort and support properties over a wide range of temperatures. Said differently, viscoelastic polyurethane foams often exhibit excellent viscoelastic properties over a narrow range of temperatures but do not exhibit excellent viscoelastic properties over a broad temperature range of temperatures. Attempts to improve the viscoelastic properties of viscoelastic polyurethane foams over a broad range of temperatures have been largely unsuccessful.

Accordingly, it would be advantageous to provide a viscoelastic polyurethane foam that overcomes these inadequacies, which has low resilience, good softness, and other properties over a wide range of temperatures and is durable, e.g. maintains these properties for many years despite exposure to extreme temperatures and conditions.

BRIEF SUMMARY OF THE DISCLOSURE AND ADVANTAGES

The subject disclosure provides a viscoelastic polyurethane foam comprising the reaction product of a toluene diisocyanate and an isocyanate reactive component. The isocyanate reactive component includes a first polyether triol, a second polyether triol, an amino alcohol chain extender, and a hydrolyzable polyether polydimethylsiloxane copolymer. The first polyether triol has a weight-average molecular weight of from 500 to 5,000 g/mol, at least 60 parts by weight ethyleneoxy units, based on the total weight of the first polyether triol, and at least 10% ethyleneoxy end caps. The second polyether triol, which is different from the first polyether triol, has a weight-average molecular weight of from 5,000 to 10,000 g/mol and at least 80% ethyleneoxy end caps.

A method of forming the viscoelastic polyurethane foam is also provided. The method includes the step of providing the toluene diisocyanate, the first polyether triol, the second polyether triol, the amino alcohol chain extender, and the hydrolyzable polyether polydimethylsiloxane copolymer as well as the step of reacting the toluene diisocyanate, the first and the second polyether triols, the amino alcohol chain extender, and the hydrolyzable polyether polydimethylsiloxane copolymer to form the viscoelastic polyurethane foam.

The toluene diisocyanate, the first and the second polyether triols, the amino alcohol chain extender, and the hydrolyzable polyether polydimethylsiloxane copolymer chemically react to form a viscoelastic polyurethane which has a specific molecular structure and a viscoelastic polyurethane foam that exhibits excellent physical properties over a broad range of temperatures, especially at lower temperatures. Said differently, the viscoelastic polyurethane foam of this disclosure tend to exhibit excellent viscoelastic properties, e.g. slow recovery (and thus high hysteresis) during a compression cycle, over a broad range of temperatures. From a practical standpoint, the polyurethane foam of the subject disclosure provides excellent comfort and support properties over a broad range of temperatures and is durable, e.g. maintains these properties for many years despite exposure to extreme temperatures and conditions, which makes it optimal for use in seating applications in various vehicles, such as automobiles, tractors, snowmobiles, etc.

DETAILED DESCRIPTION OF THE DISCLOSURE

The viscoelastic polyurethane foam of the subject disclosure is particularly useful use in the transportation industries, e.g. for use in seating applications in various vehicles, such as automobiles, off-road vehicles, trucks, tractors, military vehicles, boats, trains, etc. Seats in such vehicles are subjected to varying temperatures, especially in areas that have cold seasons and warm seasons. One typical automotive seating application utilizes a thin (0.5 to 2.0 cm) layer of the viscoelastic polyurethane foam either molded or slabstock and a molded high resilience foam underneath. Other seating foam applications include co-molding with the high resilience foam layer where the components of the viscoelastic polyurethane foam can be sprayed or poured. The layer of the viscoelastic polyurethane foam enhances the feel and the pressure relieving capability of the automotive seat.

However, the viscoelastic polyurethane foam of the subject disclosure is not limited to use in the transportation industries. As one example, the viscoelastic polyurethane foam is particularly suitable for use in sporting equipment that is subjected to cold temperatures, such as hockey or football equipment. As another example, the viscoelastic polyurethane foam of the subject disclosure is particularly suitable for seat cushions to be used outdoors, such as those used by spectators at a football game or by hunters in their hunting blinds.

The viscoelastic polyurethane foam typically remains flexible and demonstrates viscoelasticity from 40 to −20° C. while maintaining other physical properties. Generally, viscoelasticity is the phenomenon of exhibiting both elastic (solid-like or energy storing) and viscous (liquid-like or energy dissipating) properties. Viscoelastic properties of viscoelatic polyurethane foams are typically optimal at the glass transition temperature ($T_g$) of the polyurethane. That is, viscoelastic polyurethane foams typically exhibit optimum viscoelasticity at or around the $T_g$ of the polyurethane. The $T_g$ as well as a tangent delta (tan σ) are determined via dynamic mechanical thermal analysis (DMTA).

The $T_g$ is the temperature at which amorphous (noncrystalline) polymers are converted from a brittle, glasslike form to a rubbery, flexible form. Of course, if the temperature of the polyurethane drops below its $T_g$, the polyurethane tends to become brittle or "freezes" and thus the polyurethane, and consequently the viscoelastic polyurethane foam, hardens. Alternatively, as the temperature of the polyurethane rises above its $T_g$, the polyurethane behaves in an elastic manner and thus becomes more rubber-like. As such, $T_g$ is a good indicator of viscoelasticity.

Viscoelastic polyurethane foams typically have at least one $T_g$ above 0° C. The viscoelastic polyurethane foam of the subject disclosure typically has a primary and a secondary Tg, i.e., two $T_g$'s. The primary $T_g$ of the viscoelastic polyurethane foam of the subject disclosure is typically less than 0, alternatively less than −15, alternatively less than −18, alternatively from −18 to −60, alternatively from −20 to −60, and alternatively from −20 to −26, ° C. The secondary $T_g$ of the viscoelastic polyurethane foam of the subject disclosure is typically less than −40, alternatively less than −50, alternatively less than −55, alternatively from −40 to −70, alternatively from −50 to −60, and alternatively from −53 to −59, ° C.

The DMTA also produces the tan σ. The tan σ is the ratio of the loss modulus to the storage modulus (a measure of the energy dissipation of a material) and, when measured over a range of temperatures, tan σ is generally an indicator of the viscoelasticity of a polyurethane foam at those temperatures. That is, the tan σ is related to the ability of the foam to dissipate energy during a compression cycle and is related to a recovery time of the viscoelastic polyurethane foam. Typically, the lower the tan σ value, the broader the $T_g$ range of the viscoelastic polyurethane foam. A viscoelastic polyurethane foam having a tan σ greater than 1 typically has a narrow $T_g$ range which decreases flexibility of the foam at low temperatures (e.g below 0° C.) thereby negatively impacting the foams comfort and support properties. In contrast, a viscoelastic polyurethane foam having a tan σ less than 1 typically has a broad $T_g$ range which increases flexibility of the foam at low temperatures (e.g below 0° C.) thereby providing excellent comfort and support properties. The slope of the tan σ curve of the viscoelastic polyurethane foam for the primary $T_g$ of the subject disclosure is typically less than 1, alternatively less than 0.6, alternatively less than 0.5, alternatively from 0.3 to 0.6, alternatively from 0.4 to 0.5. The slope of the tan σ curve of the viscoelastic polyurethane foam for the secondary $T_g$ of the subject disclosure is typically less than 1, alternatively less than 0.5, alternatively less than 0.35, alternatively from 0.2 to 0.5, alternatively from 0.3 to 0.35.

Additional physical properties of the viscoelastic polyurethane foam that are advantageous include elongation, resilience, and recovery characteristics such as indention force deflection. Further, the instant viscoelastic polyurethane foam typically has a surface that is not tacky and that does not have any oily residue detectable to the touch.

The viscoelastic polyurethane foam of the subject disclosure exhibits excellent physical properties at standard use temperatures. More specifically, at 21° C., the viscoelastic polyurethane foam typically has: an elongation of greater than 100, alternatively greater than 200, alternatively from 100 to 300, % when tested in accordance with ASTM D3574-11; a resilience of less than 30, alternatively less than 25, alternatively from 1 to 30, alternatively from 1 to 25, alternatively from 25 to 30, % when tested in accordance with ASTM D3574-11; a 25% indentation force deflection (25% IFD) from 1 to 100, alternatively from 5 to 30, lbs/50 in² on a four inch thick test sample when tested in accordance with ASTM D3574-11; a recovery of greater than 60, alternatively greater than 75, alternatively from 50 to 100, alternatively from 80 to 100, % when tested in accordance with ASTM D3574-11; and a recovery time of less than 30, alternatively less than 15, alternatively less than 10, alternatively from 1 to 30, seconds when tested in accordance with ASTM D3574-11.

Further, the viscoelastic polyurethane foam of the subject disclosure exhibits excellent physical properties at lower use temperatures. More specifically, at 0° C., the viscoelastic polyurethane foam typically has: an elongation of greater than 100, alternatively greater than 200, alternatively from 100 to 300, % when tested in accordance with ASTM D3574-11; a resilience of less than 30, alternatively less than 25, alternatively from 1 to 30, alternatively from 1 to 25, alternatively from 25 to 30, % when tested in accordance with ASTM D3574-11; a 25% indentation force deflection (25% IFD) from 1 to 100, alternatively from 5 to 30, lbs/50 in² on a four inch thick test sample when tested in accordance with ASTM D3574-11; a recovery of greater than 60, alternatively greater than 75, alternatively from 50 to 100, alternatively from 80 to 100, % when tested in accordance with ASTM D3574-11; and a recovery time of less than 30, alternatively less than 15, alternatively less than 10, alternatively from 1 to 30, seconds when tested in accordance with ASTM D3574-11.

The subject disclosure provides a viscoelastic polyurethane foam comprising the reaction product of a toluene diisocyanate and an isocyanate reactive component. The viscoelastic polyurethane foam of the subject disclosure has a density of from 1 to 15, alternatively from 1.5 to 10 pcf, alternatively from 1.7 to 6 pcf, alternatively from 1.8 to 4 pcf, pounds per cubic foot (pcf).

The instant disclosure also provides a polyurethane system comprising the toluene diisocyanate and the isocyanate reactive component. Typically, the system is provided in two or more discrete components, such as the toluene diisocyanate and the isocyanate reactive (or resin) component, i.e., as a two-component (or 2K) system, which is described further below. It is to be appreciated that reference to the toluene diisocyanate and isocyanate reactive component, as used herein, is merely for purposes of establishing a point of reference for placement of the individual components of the system, and for establishing a parts by weight basis. As such, it should not be construed as limiting the present disclosure to only a 2K system. For example, the individual components of the system can all be kept distinct from each other.

Typically, the toluene diisocyanate includes a mixture of 2,4' toluene diisocyanate and 2,6' toluene diisocyanate. In one embodiment, the viscoelastic polyurethane foam includes 80% by weight 2,4 isomer and 20% by weight 2,6 isomer.

In one embodiment the viscoelastic polyurethane foam of the instant disclosure includes the reaction product of only the toluene diisocyanate and the isocyanate-reactive component. This embodiment is substantially free of (comprises <1% by weight) additional isocyanates. That is, only toluene diisocyanate is used to from the viscoelastic polyurethane foam of this embodiment.

However, in other embodiments additional isocyanates (in addition to the toluene diisocyanate) may be used to form the viscoelastic polyurethane foam. These additional isocyanates include, but are not limited to, aliphatic and aromatic isocyanates. In these additional embodiments, these additional isocyanates are selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

The additional isocyanate may be an isocyanate prepolymer. The isocyanate prepolymer is typically a reaction product of an isocyanate and a polyol and/or a polyamine. The isocyanate used to form the prepolymer can be any isocyanate as described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

The isocyanate reactive component includes a first and second polyether triol. Typically, the first and second polyether triols are formed via alkoxylation and include a plurality of alkyleneoxy groups. The term alkyleneoxy group describes a mer, or unit. The alkyleneoxy group is the unit which results from the polymerization of the alkylene oxide. The plurality of polymeric side chains typically include alkyleneoxy groups selected from the group of ethyleneoxy groups, propyleneoxy groups, butyleneoxy groups, and combinations thereof. The amount of alkyleneoxy groups in the polyether triols is referenced in parts by weight, based on the total weight of the particular polyether triol. The plurality of alkyleneoxy groups may be arranged to form polyether polyols which are described as polyols having random alkyleneoxy groups, polymers having repeating alkyleneoxy groups, and polymers having blocked alkyleneoxy groups. The plurality of polymeric side chains have alkoxyl end caps selected from the group of ethyleneoxy end caps, propyleneoxy end caps, butyleneoxy end caps, and combinations thereof. The amount of alkyleneoxy end caps in the polyether triols is referenced in percent (%), based on the total number of end caps in a sample of the particular polyether triol.

The first polyether triol has a weight-average molecular weight of from 500 to 5,000, alternatively from 3,000 to 4,000, g/mol, and a hydroxyl number of from 30 to 60, alternatively from 44 to 48, mg KOH/g. The first polyether triol typically has a plurality of internal blocks formed from oxyalkylene monomers and a plurality of end caps attached to the plurality of internal blocks. The ethyleneoxy-rich first polyether triol typically has at least 60, alternatively at least 70, parts by weight ethyleneoxy units, based on the total weight of the first polyether triol. The first polyether triol typically has at least at least 10, alternatively at least 25, % ethyleneoxy end caps.

The second polyether triol typically has a higher molecular weight than the first polyether triol. More specifically, the second polyether triol has a weight-average molecular weight of from 5,000 to 10,000 g/mol, alternatively from 6,000 to 7,000 g/mol and a hydroxyl number of from 10 to 40 mg KOH/g, alternatively from 20 to 35 mg KOH/g, alternatively from 24 to 26 mg KOH/g. The second polyether triol also typically has a plurality of internal blocks formed from oxyalkylene monomers and a plurality of end caps attached to the plurality of internal blocks. The second polyether triol typically has at least 60, alternatively at least 70, parts by weight ethyleneoxy units, based on the total weight of the second polyether triol. The second polyether triol typically has at least at least 80% ethyleneoxy end caps, alternatively about 100% ethyleneoxy end caps.

In a typical embodiment, the second polyether triol has about 100% ethyleneoxy end caps. More specifically, by "about" 100% ethyleneoxy end caps, it is meant that all intended capping of the second polyether triol is ethyleneoxy capping, with any non-ethyleneoxy capping resulting from trace amounts of other alkylene oxides or other impurities. As such, the capping is typically 100% ethyleneoxy, but may be slightly lower, such as at least 99% ethylene oxide capping, depending on process variables and the presence of impurities during the production of the second polyether triol. The about 100% ethyleneoxy capping provides substantially (about 100%) all primary hydroxyl groups, which typically react faster than secondary hydroxyl groups. The second polyether triol having about 100% ethyleneoxy capping also typically reacts faster than a polyol having propyleneoxy capping, as a propyleneoxy-capped polyol is stearically hindered.

The first polyether triol is typically included in the isocyanate reactive component in amount of from 50 to 95 parts by weight, alternatively from 60 to 90 parts by weight, alternatively about 75 parts by weight, based on the total parts by weight of the first and the second polyether triols. The second polyether triol is typically included in the isocyanate reactive component in amount of from 5 to 50 parts by weight, alternatively from 15 to 35 parts by weight, alternatively about 25 parts by weight, based on the total parts by weight of the first and the second polyether triols. When the amounts of the first and the second polyether triols are expressed as a basis of the total weight of the resin composition, instead of the first and the second polyether triols, the amounts may vary. For example, the amounts may vary if additional components are taken into consideration. Further, the first polyether triol and the second polyether triol may be present in the isocyanate reactive component in a weight ratio of from 1:1 to 5:1, alternatively from 2:1 to 4:1, alternatively about 3:1.

Typically, the first and the second polyether triols react with the toluene diisocyanate (and the amino alcohol chain extender) to form the viscoelastic polyurethane foam with excellent viscoelastic properties at lower temperatures (<0° C.), while maintaining the viscoelastic properties of the viscoelastic polyurethane foam at higher temperatures (>0° C.). Specifically, the amounts and structure of the first and the second polyether triols in combination with the use of the amino alcohol chain extender effect the slope of the tan σ peak and thereby the use temperature range of the foam. Accordingly, the amount of the first and the second polyether triols and the amino alcohol chain extender set forth typically provide the viscoelastic polyurethane foam with excellent viscoelastic properties over a broad range of use temperatures.

The isocyanate reactive component may also include other polyols in addition to the first and the second polyether triols described above. These may include polyester polyols or polyamine polyols. The polyester polyols may be obtained by the condensation of appropriate proportions of glycols and higher functionality polyols with polycarboxylic acids. Still further suitable polyols include hydroxyl-terminated polythioethers, polyamides, polyesteramides, polycarbonates, polyacetals, polyolefins and polysiloxanes. Other polyols that may be used include dispersions or solutions of addition or condensation polymers in polyols of the types described above. Such modified polyols, often referred to as polymer polyols, graft polyols, or graft dispersions, can include products obtained by the in-situ polymerization of one or more vinyl monomers, for example styrene and acrylonitrile, in polymeric polyols, for example polyether polyols, or by the in-situ reaction between a polyisocyanate and an amino- or hydroxy-functional compound, such as triethanolamine, in a polymeric polyol.

The isocyanate reactive component also includes an amino alcohol chain extender. The amino alcohol chain extender is typically a low molecular weight, hygroscopic amino alcohol. More specifically, the amino alcohol chain extender typically has a weight-average molecular weight of from 50 to 500 g/mol, alternatively from 75 to 250 g/mol and a backbone chain with from 2 to 8 carbon atoms, alternatively from 2 to 6 carbon atoms. In a typically embodiment, the amino alcohol chain extender is selected from the group of ethanolamine, diethanolamine, triethanolamine, and mixtures thereof. In a one embodiment, the amino alcohol chain extender is diethanolamine. However, it is to be appreciated that amino alcohol chain extenders other than those specifically disclosed above may be used in the isocyanate reactive component. The amino alcohol chain extender is typically included in the isocyanate reactive component in amount of from 0.5 to 10 parts by weight, alternatively from 1 to 5 parts by weight, alternatively from 2 to 4 parts by weight, based on 100 parts by weight of the first and the second polyether triols.

Without intending to be bound by theory, it is believed that the amino alcohol chain extender and the isocyanate react to form urethane hard segments within the foam that are incorporated into the polyurethane formed therefrom and thereby improve the viscoelastic properties of the viscoelastic polyurethane foam at temperatures above 0° C. That is, the combination of the first and the second polyether triols and the amino alcohol chain extender provides flexibility to produce viscoelastic polyurethane foams that perform satisfactorily over a wide range of temperatures.

The isocyanate reactive component also includes a hydrolyzable polydimethylsiloxane copolymer. The hydrolyzable polydimethylsiloxane copolymer hydrolyzes on exposure to water, which is typically included in the isocyanate reactive component. Without being bound by theory, it is believed that the hydrolyzable polydimethylsiloxane copolymer generates a froth which is sufficient to withstand the exotherm created by the reaction between the toluene diisocyanate and reactive first polyether triol and the reactive second polyether triol and the amino alcohol chain extender and which allows formation of the viscoelastic polyurethane foam of the subject disclosure. Notably, the hydrolyzable polydimethylsiloxane copolymer does not negatively impact the properties of the viscoelastic polyurethane foam.

The hydrolyzable polydimethylsiloxane copolymer typically has a viscosity at 25° C. of from 10,000 to 20,000, alternatively from 12,000 to 16,000, alternatively from 13,000 to 15,000, alternatively about 14,000, cps. The hydrolyzable polydimethylsiloxane copolymer also typically has a specific gravity of from 0.8 to 1.0, alternatively from 0.85 to 0.95, alternatively about 0.092, g/cm$^3$.

The hydrolyzable polydimethylsiloxane copolymer is typically included in the isocyanate reactive component in an amount of from 0.5 to 10 parts by weight, alternatively from 1 to 4 parts by weight, alternatively from 2 to 3 parts by weight, based on 100 parts by weight of the first and the second polyether triols. In a typical embodiment, the amino alcohol chain extender and the hydrolyzable polydimethylsiloxane copolymer are included in the isocyanate reactive component in weight ratio of about 6:5.

The isocyanate reactive component also typically includes a blowing agent. During the exothermic reaction of the isocyanate reactive component and the toluene diisocyanate, the blowing agent promotes the release of a blowing gas which forms voids, or cells, foaming the polyurethane. The blowing agent of the present disclosure may be a physical blowing agent, a chemical blowing agent, or a combination thereof.

The chemical blowing agent chemically reacts with the toluene diisocyanate or with the isocyanate reactive component. Non-limiting examples of chemical blowing agents that are suitable for the purposes of the subject disclosure include formic acid, water, and combinations thereof. A specific example of a chemical blowing agent that is suitable for the purposes of the subject disclosure is water.

In one embodiment, the blowing agent includes water. Water generates $CO_2$ which foams the polyurethane and also forms urea linkages or "hard segments". The $CO_2$ which is formed from the reaction of the water and the isocyanate can be supplemented with the addition of one or more physical blowing agents.

The physical blowing agent does not chemically react with the isocyanate reactive component and/or the toluene diisocyanate to provide a blowing gas. The physical blowing agent can be a gas or liquid. The physical blowing agent that is liquid typically evaporates into a gas when heated, and typically returns to a liquid when cooled. Suitable physical blowing agents for the purposes of the subject disclosure may include hydrofluorocarbons (HFCs), hydrocarbons, and combinations thereof.

The isocyanate reactive component typically includes a catalyst. The catalyst may include one or more catalysts and typically includes a combination of catalysts. The catalyst is typically present in the isocyanate reactive component to catalyze the exothermic reaction between the isocyanate reactive component and the toluene diisocyanate. It is to be appreciated that the catalyst is typically not consumed in, the exothermic reaction between the isocyanate reactive component and the toluene diisocyanate. That is, the catalyst typically participates in, but is not consumed in the exothermic reaction. The catalyst may include any suitable catalyst or mixtures of catalysts known in the art. Examples of suitable catalysts include, but are not limited to, gelation catalysts, e.g. amine catalysts in dipropylene glycol; blowing catalysts, e.g. bis(dimethylaminoethyl)ether in dipropylene glycol; and metal catalysts, e.g. tin, bismuth, lead, etc. If included, the catalyst can be included in various amounts.

In addition to the catalyst, the isocyanate reactive component may optionally include a surfactant. The surfactant typically supports homogenization of the blowing agent and the polyether triols and regulates a cell structure of the polyurethane foam. The surfactant may include any suitable surfactant or mixtures of surfactants known in the art. Non-limiting examples of suitable surfactants include various silicone surfactants, salts of sulfonic acids, e.g. alkali metal and/or ammonium salts of oleic acid, stearic acid, dodecylbenzene- or dinaphthylmethane-disulfonic acid, and ricinoleic acid, foam stabilizers such as siloxaneoxyalkylene copolymers and other organopolysiloxanes, oxyethylated alkyl-phenols, oxyethylated fatty alcohols, paraffin oils, castor oil, castor oil esters, and ricinoleic acid esters, and cell regulators, such as paraffins, fatty alcohols, and dimethylpolysiloxanes. If included, the surfactant may be included in the isocyanate reactive component in various amounts.

The isocyanate reactive component may optionally include one or more additives. The additive may include any suitable additive or mixtures of additives known in the art. Suitable additives for purposes of the present disclosure include, but are not limited to, cross-linkers, chain-terminators, processing additives, flame retardants, colorant, adhesion promoters, anti-oxidants, defoamers, anti-foaming agents, water scavengers, molecular sieves, fumed silicas, ultraviolet light stabilizers, fillers, thixotropic agents, silicones, colorants, inert diluents, and combinations thereof. If included, the additive can be included in the isocyanate reactive component in various amounts.

The subject disclosure further provides a method of forming the viscoelastic polyurethane foam. The method includes the step of providing the toluene diisocyanate, the first polyether triol, the second polyether triol, the amino alcohol chain extender, and the hydrolyzable polyether polydimethylsiloxane copolymer, as described above.

The method also includes the step of reacting the toluene diisocyanate, the first and the second polyether triols, the amino alcohol chain extender, and the hydrolyzable polyether polydimethylsiloxane copolymer to form the viscoelastic polyurethane foam. To form the viscoelastic polyurethane foam of the subject disclosure, the toluene diisocyanate and the first and the second polyether triols are reacted at an isocyanate index of from 65 to 105, alternatively from 75 to 90. An isocyanate index, as is known in the art, is the ratio of NCO groups in the isocyanate to the OH groups in the first and the second polyether triols.

The following examples are intended to illustrate the present disclosure and are not to be read in any way as limiting to the scope of the present disclosure.

EXAMPLES

Examples 1-4 are viscoelastic polyurethane foams formed in accordance with the instant disclosure. Comparative Example 1 is polyurethane foam not formed in accordance with the instant disclosure, which is included for comparative purposes.

Referring now to Table 1, a series of polyurethane systems including an Isocyanate-reactive component and an Isocyanate are described. The polyurethane systems of Table 1 are used to form Examples 1-4 and Comparative Example 1. The amount and type of each component used to form each Isocyanate-reactive Component is indicated in Table 1 below with all values in parts by weight, based on 100 parts by weight of total polyether triols present in each Isocyanate-reactive Component, i.e., the parts by weight for each component are not normalized to 100 parts of the total weight of the Isocyanate-reactive Component. Table 1 also includes an isocyanate index at which the Isocyanate-reactive Component and the Isocyanate are reacted to form Examples 1-4 and Comparative Example 1. As set forth above, the isocyanate index is the ratio of NCO groups in the Isocyanate to OH groups in the first and the second polyether triols in the Isocyanate-reactive Component.

TABLE 1

| Component | Ex. 1 | Ex. 2 | Ex. 3 | Ex. 4 | Comp. Ex. 1 |
|---|---|---|---|---|---|
| Isocyanate-reactive Component | | | | | |
| First Polyether Triol | 75.0 | 75.0 | 75.0 | 75.0 | 40.0 |
| Second Polyether Triol | 25.0 | 25.0 | 25.0 | 25.0 | 60.0 |
| Water | 1.9 | 1.9 | 1.9 | 1.9 | 1.5 |
| PDMS | 2.5 | 2.5 | 2.5 | 2.5 | 0.0 |
| Surfactant A | 0.0 | 0.0 | 0.0 | 0.0 | 0.3 |
| Surfactant B | 0.0 | 0.0 | 0.0 | 0.0 | 8.0 |
| Catalyst A | 0.1 | 0.1 | 0.1 | 0.1 | 0.2 |
| Catalyst B | 0.1 | 0.1 | 0.1 | 0.1 | 0.3 |

TABLE 1-continued

| Component | Ex. 1 | Ex. 2 | Ex. 3 | Ex. 4 | Comp. Ex. 1 |
|---|---|---|---|---|---|
| Catalyst C | 0.0 | 0.0 | 0.0 | 0.0 | 0.0 |
| Amino Alcohol Chain Extender | 3.0 | 3.0 | 3.0 | 3.0 | 0.0 |
| Isocyanate | | | | | |
| TDI | 26.0 | 26.0 | 24.2 | 23.6 | 0.0 |
| TDI Index | 85.0 | 85.0 | 79.0 | 77.0 | 0.0 |
| MDI | 0.0 | 0.0 | 0.0 | 0.0 | 43.8 |
| MDI Index | 0.0 | 0.0 | 0.0 | 0.0 | 85.0 |

First Polyether Triol is a polyether polyol having a weight-average molecular weight of about 3650 g/mol, a hydroxyl number of about 46 mg KOH/g, comprising 75 parts by weight ethyleneoxy units and 25 parts by weight propyleneoxy units, based on 100% of the alkyleneoxy units in the First Polyether Triol.

Second Polyether Triol is a polyether polyol having a weight-average molecular weight of about 6500 g/mol, a hydroxyl number of about 25 mg KOH/g, and comprising about 75 parts by weight ethyleneoxy units and about 25 parts by weight propyleneoxy units, based on 100 part by weight of the alkyleneoxy units in the Second Polyether Triol and having about 100% ethyleneoxy end caps.

Catalyst A is a solution of 33% by weight triethylenediamine and 67% by weight dipropylene glycol.

Catalyst B is a solution of 70% by weight bis-(2-dimethylaminoethyl)ether and 30% by weight dipropylene glycol.

Catalyst C is stannous octoate.

PDMS is a hydrolyzable polydimethylsiloxane copolymer.

Surfactant A is a polydimethylsiloxane having hydroxyl functionality.

Surfactant B is a butanediol isomer.

Amino Alcohol Chain Extender is diethanolamine.

TDI is toluene diisocyanate comprising 80% by weight 2,4 isomer and 20% by weight 2,6 isomer.

MDI is a mixture of diphenylmethane diisocyanate (MDI) about 1.1% 2,2'-MDI, about 25.0% 2,4'-MDI, about 62.5% 4,4'-MDI, and 11.4% polymeric MDI, based on the total weight of the isocyanate.

The foams of Examples 1-4 and Comparative Example 1 are made using a Beamech® M-30 Laboratory Foam Machine. More specifically, the compounds set forth in Table 1 are metered into and mixed with a pin-type mixer by the application of high shear energy via a close tolerance between a mixer pin element and a head barrel to form a reaction mixture. The reaction mixture is poured onto a conveyer which is moving. The conveyer is angled to permit bun height control. The reaction mixture leaves the mixhead in a liquid state for an even laydown. The conveyer has side support walls which are lined with plastic film and move at the same speed as the conveyer. The Beamech® M-30 Laboratory Foam Machine produces foam "buns" which are 24 inches wide and up to 24 inches in height by a length of up to 30 feet long. The buns are post-cured in a convection oven for 16 hours at 121° C. Samples of appropriate dimensions for the required testing are subsequently cut from the previously made foams. Samples of appropriate dimensions for each of Examples 1-4 and Comparative Example 1 are subsequently cut for testing.

Various physical properties of Examples 1-4 and Comparative Example 1 are measured at constant temperature and pressure in accordance with ASTM D3574-11. The test results for each of the Examples are set forth in Table 2 below.

TABLE 2

| | Ex. 1 | Ex. 2 | Ex. 3 | Ex. 4 | Comp. Ex. 1 |
|---|---|---|---|---|---|
| ASTM D3574-11 | | | | | |
| Density, PCF ASTM D1622 | 3.20 | 3.21 | 3.33 | 3.35 | 3.50 |
| Tensile, PSI | 7 | 9 | 6 | 6 | 15 |
| Elongation, % | 246 | 280 | 222 | 228 | 183 |
| Tear, PI | 1.5 | 1.5 | 1.2 | 1.0 | 2.5 |
| Resilience, % | 30 | 29 | 32 | 25 | 14 |
| IFD, LBS/50 SQ. IN. (4 INCH) ASTM D3574-11 | | | | | |
| 25% | 10 | 10 | 8 | 7 | 20 |
| 25% Return | 9 | 9 | 7 | 5 | 14 |
| 65% | 27 | 27 | 20 | 18 | 42 |
| Support factor | 2.58 | 2.61 | 2.56 | 2.65 | 2.13 |
| Recovery, % | 85 | 84 | 84 | 82 | 68 |
| Recovery Time, Sec | 4 | 4 | 4 | 6 | 25 |
| 50% Comp. Set ASTM D395 | 4 | 4 | 3 | 7 | 15 |
| Airflow, CFM ASTM D737 | 2.0 | 1.4 | 3.3 | 2.5 | 0.1 |
| Fatigue Properties (Static, I1 = SI1 and Pounding I3 = PI3) ASTM D3574-11 | | | | | |
| SI1 HEIGHT, % Loss | 2 | 2 | 1 | 2 | 3 |
| SI1 25% IFD, % Loss | 9 | 6 | 6 | 13 | 16 |
| SI1 65% IFD, % Loss | 7 | 4 | 6 | 10 | 14 |
| PI3 HEIGHT, % Loss | 1 | 1 | 2 | 3 | 2 |
| PI3 40% % Loss | 9 | 9 | 8 | 12 | 13 |
| DMA—Dynamic Mechanical Analysis | | | | | |
| Primary $T_g$, ° C. | −20 | −26 | −21 | −22 | 51 |
| Primary Tan σ (slope of the curve) | 0.41 | 0.51 | 0.42 | 0.45 | 0.44 |
| Secondary $T_g$, ° C. | −55 | −57 | −55 | −57 | −44 |
| Secondary Tan σ (slope of the curve) | 0.31 | 0.32 | 0.31 | 0.32 | 0.44 |

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the instant disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the instant disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The instant disclosure has been described in an illustrative manner, and it is to be understood that the terminology which has been used is intended to be in the nature of words of description rather than of limitation. Obviously, many modifications and variations of the instant disclosure are possible in light of the above teachings. It is, therefore, to be understood that within the scope of the appended claims, the instant disclosure may be practiced otherwise than as specifically described.

What is claimed is:

1. A viscoelastic polyurethane foam comprising a reaction product of:
   (A) a toluene diisocyanate; and
   (B) an isocyanate reactive component comprising:
      i. a first polyether triol having;
         a. a weight-average molecular weight of from 3,000 to 4,000 g/mol;
         b. at least 60 parts by weight ethyleneoxy units, based on the total weight of the first polyether triol; and
         c. at least 10% ethyleneoxy end caps;
      ii. a second polyether triol, different from said first polyether triol, having;
         a. a weight-average molecular weight of from 6,000 to 7,000 g/mol; and
         b. at least 80% ethyleneoxy end caps;
      iii. an amino alcohol chain extender; and
      iv. a hydrolyzable polyether polydimethylsiloxane copolymer;
      wherein said first polyether triol and said second polyether triol are present in said isocyanate reactive component in a weight ratio of from 1:1 to 55:1.

2. A viscoelastic polyurethane foam as set forth in claim 1 having a glass transition temperature of less than −15° C. and a tangent delta (tan σ) of 0.3 to 0.6.

3. A viscoelastic polyurethane foam as set forth in claim 1 wherein said first polyether triol comprises at least 70 parts by weight ethyleneoxy units, based on the total weight of said first polyether triol.

4. A viscoelastic polyurethane foam as set forth in claim 1 wherein said first polyether triol has at least 25% ethyleneoxy end caps.

5. A viscoelastic polyurethane foam as set forth in claim 1 wherein said second polyether triol comprises about 100% ethyleneoxy end caps.

6. A viscoelastic polyurethane foam as set forth in claim 1 wherein said amino alcohol chain extender is selected from the group of ethanolamine, diethanolamine, triethanolamine, and mixtures thereof.

7. A viscoelastic polyurethane foam as set forth in claim 1 wherein said hydrolyzable polyether polydimethylsiloxane copolymer has a viscosity of from 10,000 to 20,000 cps at 25° C.

8. A viscoelastic polyurethane foam as set forth in claim 1 wherein said toluene diisocyanate comprises 80% by weight 2,4 isomer and 20% by weight 2,6 isomer.

9. A viscoelastic polyurethane foam as set forth in claim 1 having a glass transition temperature of from −20 to −30° C. and a tangent delta (tan σ) of from 0.4 to 0.5.

10. A viscoelastic polyurethane foam as set forth in claim 1 having a 25% Indentation Force Deflection (25% IFD) from 5 to 30 lbs/50 in$^2$ on a four inch thick test sample when tested at 21° C. in accordance with ASTM D3574 and a 25% IFD from 5 to 30 lbs/50 in$^2$ on a four inch thick test sample when tested at 0° C. in accordance with ASTM D3574.

11. A method of forming a viscoelastic polyurethane foam comprising the steps of:
   providing a toluene diisocyanate;
   providing a first polyether triol having;
      a. a weight-average molecular weight of from 3,000 to 4,000 g/mol;
      b. at least 60 parts by weight ethyleneoxy units, based on the total weight of the first polyether triol; and
      c. at least 10% ethyleneoxy end caps;
   providing a second polyether triol, different from the first polyether triol, having;
      a. a weight-average molecular weight of from 6,000 to 7,000 g/mol; and
      b. at least 80% ethyleneoxy end caps;
   providing an amino alcohol chain extender;
   providing a hydrolyzable polyether polydimethylsiloxane copolymer; and
      reacting the toluene diisocyanate, the first and the second polyether triols in a weight ratio of from 1:1 to 5:1, the amino alcohol chain extender, and the hydrolyzable polyether polydimethylsiloxane copolymer to form the viscoelastic polyurethane foam.

12. A method as set forth in claim 11 wherein the viscoelastic polyurethane foam has a glass transition temperature of less than −15° C. and a tangent delta (tan σ) of from 0.3 to 0.6.

13. A method as set forth in claim 11 wherein the amino alcohol chain extender is selected from the group of ethanolamine, diethanolamine, triethanolamine, and mixtures thereof.

14. A method as set forth claim 11 wherein the toluene diisocyanate comprises 80% by weight 2,4 isomer and 20% by weight 2,6 isomer.

15. A method as set forth in claim 11 wherein the toluene diisocyanate and the first and the second polyether triols are reacted at an isocyanate index of from 65 to 105.

* * * * *

UNITED STATES PATENT AND TRADEMARK OFFICE
CERTIFICATE OF CORRECTION

PATENT NO. : 9,637,585 B2
APPLICATION NO. : 14/433530
DATED : May 2, 2017
INVENTOR(S) : Theodore M. Smiecinski et al.

Page 1 of 1

It is certified that error appears in the above-identified patent and that said Letters Patent is hereby corrected as shown below:

In the Claims

Claim 1, Column 13, Line 51, please delete "55:1" and replace with -- 5:1 --

Signed and Sealed this
Second Day of January, 2018

Joseph Matal
*Performing the Functions and Duties of the*
*Under Secretary of Commerce for Intellectual Property and*
*Director of the United States Patent and Trademark Office*